US011509452B2

(12) United States Patent
Jiao (10) Patent No.: US 11,509,452 B2
(45) Date of Patent: Nov. 22, 2022

(54) METHOD FOR GENERATING DIGITAL QUANTUM CHAOTIC WAVEPACKET SIGNALS

(71) Applicant: Yanhua Jiao, Beijing (CN)

(72) Inventor: Yanhua Jiao, Beijing (CN)

(73) Assignee: Yanhua Jiao, Beijing (CN)

( * ) Notice: Subject to any disclaimer, the term of this patent is extended or adjusted under 35 U.S.C. 154(b) by 319 days.

(21) Appl. No.: 16/976,766

(22) PCT Filed: Mar. 16, 2018

(86) PCT No.: PCT/CN2018/079278
§ 371 (c)(1),
(2) Date: Aug. 31, 2020

(87) PCT Pub. No.: WO2019/174031
PCT Pub. Date: Sep. 19, 2019

(65) Prior Publication Data
US 2021/0006390 A1 Jan. 7, 2021

(51) Int. Cl.
*H04L 9/00* (2022.01)
*G06N 10/00* (2022.01)
(Continued)

(52) U.S. Cl.
CPC ............ *H04L 9/001* (2013.01); *G06N 10/00* (2019.01); *H04L 9/0855* (2013.01); *H04B 10/70* (2013.01)

(58) Field of Classification Search
CPC ....... H04L 9/001; H04L 9/0855; G06N 10/00; H04B 10/70
(Continued)

(56) References Cited

U.S. PATENT DOCUMENTS

| 6,704,420 B1 * | 3/2004 | Goedgebuer | ........... H04L 9/001 380/263 |
| 7,072,469 B1 * | 7/2006 | Oudaltsov | ................. H04L 9/12 380/263 |

(Continued)

FOREIGN PATENT DOCUMENTS

| CN | 101834718 B | * | 5/2012 |
| CN | 107113081 A | | 8/2017 |

(Continued)

OTHER PUBLICATIONS

Hong et al., "Chaotic Phase-Coded Waveforms With Space-Time Complementary Coding for MIMO Radar Applications," in IEEE Access, vol. 6, pp. 42066-42083, 2018, doi: 10.1109/ACCESS.2018. 2859404. (Year: 2018).*

(Continued)

*Primary Examiner* — Peter C Shaw
(74) *Attorney, Agent, or Firm* — Bayramoglu Law Offices LLC (57) ABSTRACT

A method for generating digital quantum chaotic orthonormal wavepacket signals includes the following steps: construct a N-dimensional Hermitian matrix $\hat{H}$; calculate N eigen-wavefunctions $\varphi_j$ of a quantum Hamiltonian system with the Hamiltonian $\hat{H}$ by some numerical calculation methods, wherein the Hamiltonian is the Hermitian matrix $\hat{H}$; extract some or all of the eigen-functions $\varphi_j$ with obvious chaos features as quantum chaotic eigen-wavefunctions according to a chaos criterion; generate some semi-classical digital quantum chaotic wavepacket signals $\varphi_j(n)$ with the same mathematical form as the quantum chaotic eigen-wavefunctions and length N from the selected quantum chaotic eigen-wavefunctions according to the mathematical correspondence between the classical signal and the wavefunction in quantum mechanics. By combining the quantum state chaotic transition theory and the classical time-fre- (Continued)

quency analysis, some semi-classical quantum chaotic wavepacket digital signals are generated according to the mathematical correspondence between the classical time-frequency signal and the wavefunction in quantum mechanics.

10 Claims, 8 Drawing Sheets

(51) Int. Cl.
 *H04L 9/08* (2006.01)
 *H04B 10/70* (2013.01)
(58) Field of Classification Search
 USPC .......................................................... 380/38
 See application file for complete search history.

(56) References Cited

U.S. PATENT DOCUMENTS

| | | | | |
|---|---|---|---|---|
| 8,644,362 | B1 * | 2/2014 | Lauer | H04J 13/0018 |
| | | | | 375/141 |
| 2003/0007738 | A1 * | 1/2003 | Cairns | G02B 6/3816 |
| | | | | 385/56 |
| 2003/0182246 | A1 * | 9/2003 | Johnson | G06N 7/08 |
| | | | | 380/278 |
| 2010/0142588 | A1 * | 6/2010 | Yang | H04B 1/707 |
| | | | | 375/140 |
| 2018/0309477 | A1 * | 10/2018 | Michaels | H04L 27/2028 |

FOREIGN PATENT DOCUMENTS

| | | | | | |
|---|---|---|---|---|---|
| CN | 108401489 | A | * | 8/2018 | ............ G06N 10/00 |
| CN | 108401489 | A | | 8/2018 | |
| CN | 108768445 | A | * | 11/2018 | ............... H04B 1/69 |
| CN | 110824436 | A | * | 2/2020 | ............. G01S 7/282 |
| EP | 3748897 | A1 | * | 12/2020 | ............... G06N 10/00 |
| KR | 20090021463 | A | * | 3/2009 | ............... H04B 1/38 |
| WO | WO-2006026446 | A2 | * | 3/2006 | .......... H04B 17/309 |
| WO | WO-2019174031 | A1 | * | 9/2019 | ............. G06N 10/00 |

OTHER PUBLICATIONS

Fenwick et al., "Chaotic signals in radar and sonar," 2006 International Waveform Diversity & Design Conference, 2006, pp. 1-6, doi: 10.1109/WDD.2006.8321435. (Year: 2006).*
Lestriandoko et al., "Security system for surveillance radar network communication using chaos algorithm," 2014 8th International Conference on Telecommunication Systems Services and Applications (TSSA), 2014, pp. 1-6, doi: 10.1109/TSSA.2014.7065947. (Year: 2014).*
Hui-Ping Shi, The Application of Determinant and Matrix in Quantum Mechanics, Journal of Cangzhou Normal University, Mar. 2014, pp. 32-36, vol. 30, No. 1.
Zhenhe Zhu, Critiques on "Double-Wave Theory", Journal of Capital Normal University (Natural Science Edition), Jun. 2003, pp. 23-28, vol. 24, No. 2.
Balu Santhanam et al., Discrete Gauss-Hermite Functions and Eigenvectors of the Centered Discrete Fourier Transform, IEEE International Conference on Acoustics, Speech and Signal Processing—ICASSP, 2007, pp. 1385-1388.

* cited by examiner

METHOD FOR GENERATING DIGITAL QUANTUM CHAOTIC WAVEPACKET SIGNALS

CROSS REFERENCE TO THE RELATED APPLICATIONS

This application is the national phase entry of International Application No. PCT/CN2018/079278, filed on Mar. 16, 2018, the entire contents of which are incorporated herein by reference.

TECHNICAL FIELD

The invention relates to radio communication and radar, especially a method for generating digital quantum chaotic wavepacket signals.

BACKGROUND

With some excellent characteristics, such as sensitivity to initial states, pseudo randomness, aperiodicity, noise-like wideband and sharp autocorrelation, the classical chaotic signals have vast application prospect in radio communication and radar theoretically. However, they are not practical due to the impossible completion of chaotic carrier synchronization under interference.

Kehui Sun elaborated the classical chaotic signal and its application, analysis methods and typical systems in his masterworks "the principle and technology of chaotic secure communication" published by the Tsinghua University Press in February 2015, and focused on the basic techniques and methods involved in chaotic secure communication system, including chaotic carrier synchronous control technology, chaotic secure communication system scheme, chaotic encryption system principle and design, chaotic circuit design and implementation technology. According to the chaotic synchronization method described in this book, the communication performance such as the information transmission rate and the bit error rate would deteriorate sharply due to the interference.

SUMMARY

In order to solve the above technical problems, a method for generating digital quantum chaotic wavepacket signals is proposed in the present invention. By combining the quantum state chaotic transition theory and the classical time-frequency analysis, some semi-classical and digital quantum chaotic wavepacket signals are generated according to the mathematical correspondence between the classical time-frequency signal and the wavefunction in quantum mechanics. These signals not only have the almost identical features to the classical chaotic ones, so as to solve the problems of chaotic synchronization, but also have unique splitting spectrum so as to eliminate the spectrum leakage problem of BOC signal widely used in GNSS. Significantly, the novel digital quantum chaotic wavepacket signals have excellent compatibility with the classical sinusoidal ones.

The method for generating digital quantum chaotic wavepacket signals in the invention comprises the following steps:

Step one: construct a N×N Hermitian matrix $\hat{H}$;

Step two: calculate the N eigen-wavefunctions $\varphi_j$ of the quantum Hamiltonian system with the Hamiltonian by some numerical calculation methods, wherein the Hamiltonian is the N×N Hermitian matrix $\hat{H}$;

Step three: extract some or all of the eigen-wavefunctions $\varphi_j$ with obvious chaos features as quantum chaotic wavefunctions according to a chaos criterion;

Step four: generate some semi-classical and digital quantum chaotic wavepacket signals $\varphi_j(n)$ with the same mathematical form as that of the quantum chaotic eigen-wavefunctions and length N from the selected quantum chaotic wavefunctions according to the mathematical correspondence between the classical signal and the wavefunction in quantum mechanics.

Preferably, the N×N Hermitian matrix $\hat{H}$ used as a Hamiltonian of a quantum Hamiltonian system, has the following mathematical expression:

$$\hat{H}(x, y) = -\frac{a}{\sigma} e^{\frac{(x-y)^2}{b\sigma^2}}$$

wherein the a, b and $\sigma$ are specific constant parameters.

In any of the above technical solutions, it is preferred that the quantum Hamiltonian system with the Hamiltonian has quantum state chaotic transition, which is characterized that some of its eigen-wavefunctions have the similar unique features to the classical chaotic signals, wherein the Hamiltonian is the N×N Hermitian matrix $\hat{H}$.

In any of the above technical solutions, it is preferred that the eigen-wavefunction $\varphi_j$ must meet the following mathematical constraint:

$$\hat{H}\varphi_j = E_2\varphi_j;$$

wherein the $E_j$ is the energy level of a quantum corresponding to the eigen-wavefunction $\varphi_j$.

In any of the above technical solutions, it is preferred that the mentioned numerical calculation methods include the Divide and Conquer Method or the Jacobian Method or both of them.

In any of the above technical solutions, it is preferred that an unavoidable Hermitian external perturbation H' is added to the original Hermitian Hamiltonian $\hat{H}$ to get some very different eigen-vectors $\varphi_j$ by any numerical calculation method.

$$(\hat{H}+H')\varphi_j = E_j\varphi_j$$

In any of the above technical solutions, it is preferred that the momentum spectral density is used as the mentioned chaos criterion by the self-power spectrum density method.

In any of the above technical solutions, it is preferred that according to the chaos criterion, the momentum spectral density $\psi_1$ is calculated by the Fourier Transform of the eigen-wavefunctions $\varphi_j$ firstly.

In any of the above technical solutions, it is preferred that according to the chaos criterion, the chaotic property of the eigen-wavefunction $\varphi_j$ is determined by its corresponding momentum spectral density $\psi_1$.

In any of the above technical solutions, it is preferred that an eigen-wavefunction $\varphi_j$ with obviously extended momentum spectral density is chaotic, and is quantum chaotic wavefunction.

A method for generating digital quantum chaotic wavepacket signals is proposed in the invention. The digital quantum chaotic wavepacket signals which is obtained by calculating the chaotic eigen-wavefunctions of a specified quantum Hamiltonian system not only have the same features as classical chaotic ones, but also have the unique splitting spectrum characteristic that makes it similar to non-white noise. The above semi-classical and digital quantum chaotic wavepacket signals can not only solve chaotic carrier synchronization in classical chaotic secure communication, but also provide excellent compatibility with the classical sinusoidal ones.

DETAILED DESCRIPTION OF THE EMBODIMENTS

The present invention is further elaborated in accordance with the drawings and embodiments.

Embodiment 1

By combining the quantum state chaotic transition theory and the classical time-frequency analysis, some semi-classical and digital quantum chaotic wavepacket signals are generated according to the mathematical correspondence between the classical time-frequency signal and the wavefunction in quantum mechanics, These digital signals not only have the same features as the classical chaotic ones, but also have the unique splitting spectrum characteristic. The semi-classical and digital quantum chaotic wavepacket signals are generated through the following procedures shown in FIG. 1.

Figure 1:
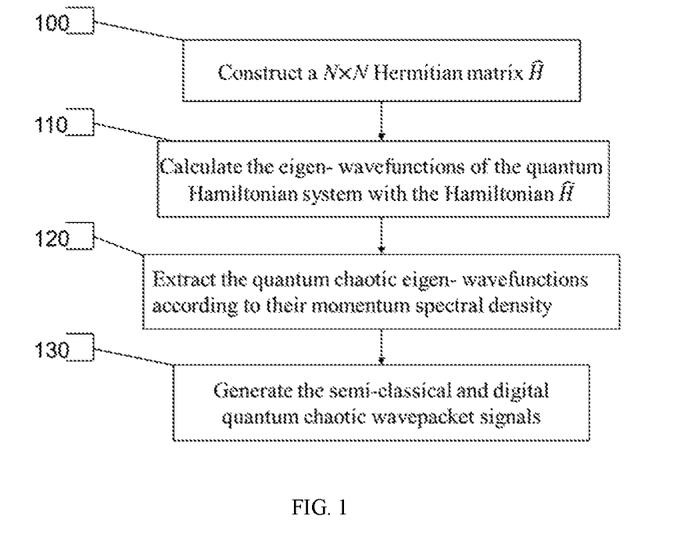
FIG. 1 is a flow chart of the method for generating digital quantum chaotic wavepacket signals according to a preferred embodiment of the invention.

Executing step 100: construct a N×N Hermitian matrix $\hat{H}$ as the Hamiltonian of a quantum Hamiltonian system, and the Hermitian matrix $\hat{H}$ has the following mathematical expression:

$$\hat{H}(x, y) = -\frac{a}{\sigma} e^{\frac{(x-y)^2}{b\sigma^2}}$$

wherein the a, b and σ are specific constant parameters.

Executing step 110: calculate the N eigen-wavefunctions $\varphi_j$ of the quantum Hamiltonian system with the Hamiltonian by some numerical calculation methods, wherein the Hamiltonian is the N×N Hermitian matrix $\hat{H}$, and the eigen-wavefunction $\varphi_j$ meets the following mathematical constraint:

$$\hat{H}\varphi_j = E_j \varphi_j$$

wherein the $E_j$ is the energy level of a quantum corresponding to the eigen-wavefunction $\varphi_j$. Furthermore, an unavoidable Hermitian external perturbation H' is added to the original Hermitian Hamiltonian $\hat{H}$ to get some very different eigen-vectors $\varphi_j$ by any numerical calculation method including the Divide and Conquer Method, the Jacobian Method and so on.

$$(\hat{H} + H')\varphi_j = E_j \varphi_j$$

Executing step 120: momentum spectral density is used as a chaos criterion to extract some or all of the eigen-wavefunctions $\varphi_j$ with obvious chaos features as quantum chaotic wavefunctions. As for the chaos criterion, the chaotic property of the eigen-wavefunction $\varphi_j$ is determined by its corresponding momentum spectral density $\psi_j$ which equals to its Fourier Transform. Specifically, an eigen-wavefunction $\varphi_j$ with obviously extended momentum spectral density is chaotic.

Executing step 130, generate some semi-classical and digital quantum chaotic wavepacket signals $\varphi_j(n)$ with the same mathematical form as that of the quantum chaotic eigen-wavefunctions and length N from the selected quantum chaotic eigen-wavefunctions according to the mathematical correspondence between the classical signal and the wavefunction in quantum mechanics.

Embodiment 2

The quantum chaotic wavepacket unified radio system is a unified software defined radio (SDR) system which unifies the quantum chaotic wavepacket secure communication, the quantum chaotic wavepacket primary radar and the quantum chaotic wavepacket secondary radar. The all-digital, multi-functional and configurable quantum chaotic wavepacket unified radio system is classified into two categories: the direct quantum chaotic wavepacket unified radio system shown in FIG. 2 and the frequency-converted quantum chaotic wavepacket unified radio system shown in FIG. 2A.

Figure 2:
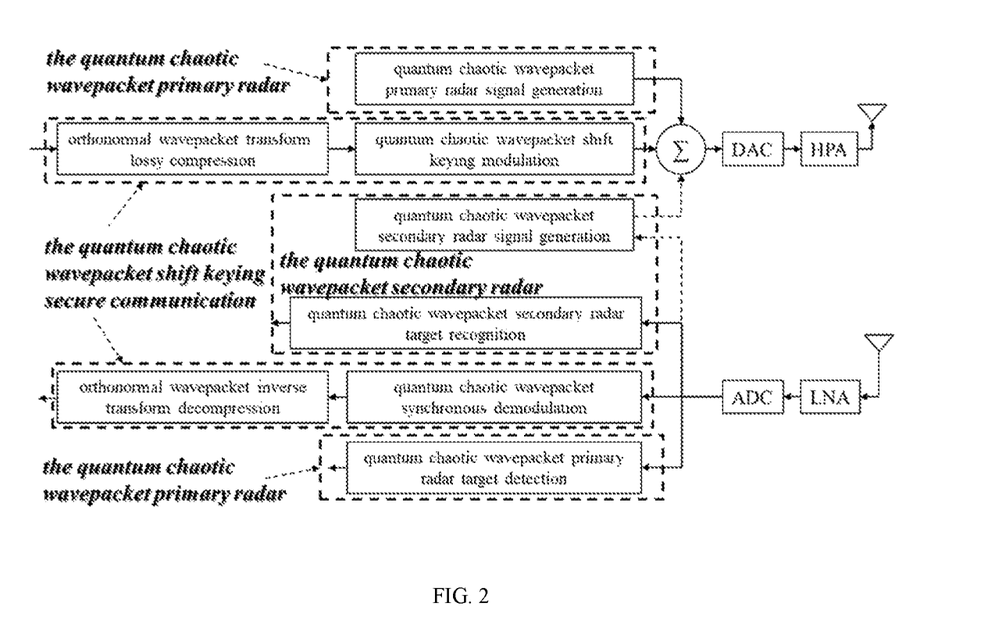
FIG. 2 is a block diagram of the direct quantum chaotic wavepacket unified radio system according to a preferred embodiment of the invention.
Figure 2A:
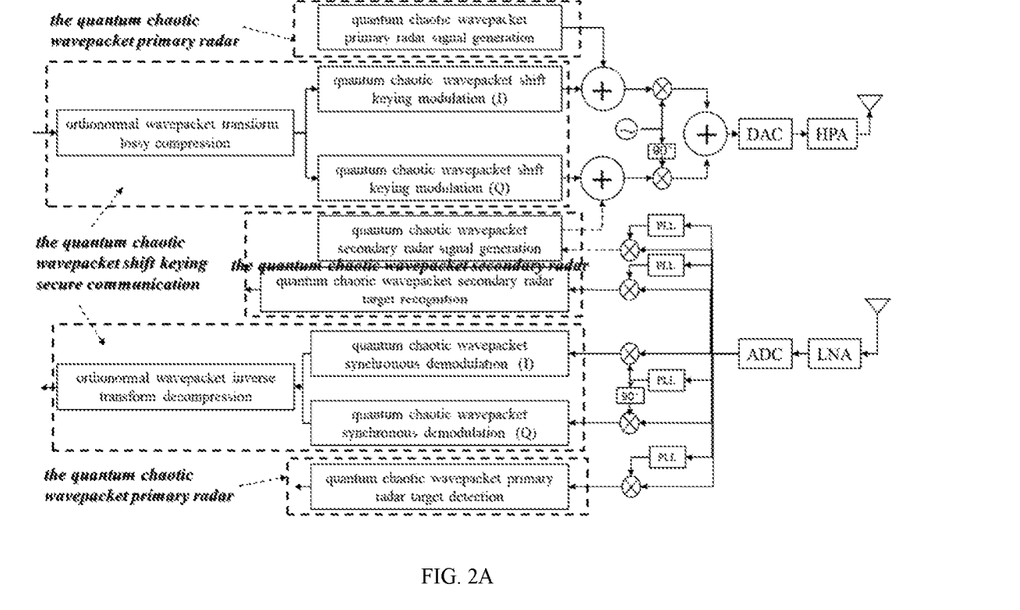
FIG. 2A is a block diagram of the frequency-converted quantum chaotic wavepacket unified radio system according to the preferred embodiment of the invention shown in FIG. 2.
Figure 2B:
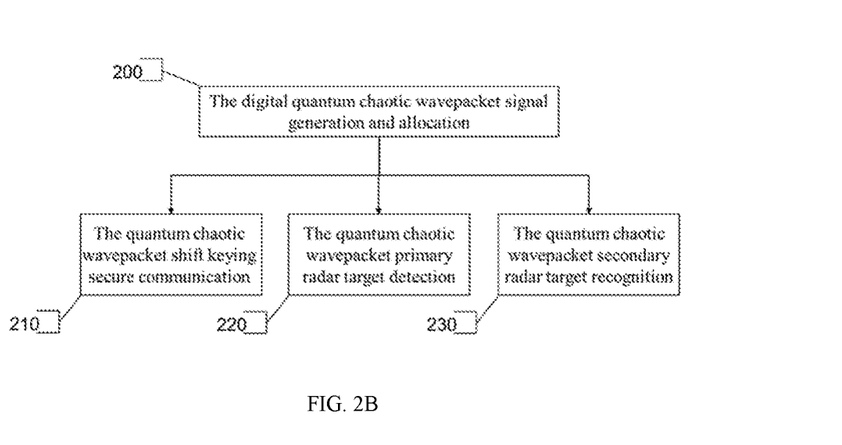
FIG. 2B is a work flow chart of the quantum chaotic wavepacket unified radio system according to the preferred embodiment of the invention shown in FIG. 2.

The quantum chaotic wavepacket unified radio system consists of a quantum chaotic wavepacket shift keying secure communication sub-system, a quantum chaotic wavepacket primary radar sub-system and a quantum chaotic wavepacket secondary radar sub-system. As shown in FIG. 2B, the whole workflow of the quantum chaotic wavepacket unified radio system consists of four sub-processes, wherein digital quantum chaotic wavepacket signal generation and allocation subprocess 200 must be carried out first, then at least one of quantum chaotic wavepacket shift keying secure communication subprocess 210, quantum chaotic wavepacket primary radar target detection subprocess 220 and quantum chaotic wavepacket secondary radar target recognition subprocess 230 should be carried out.

I. Subprocess 200: Generate and Allocate the Digital Quantum Chaotic Wavepacket Signals According to the Specific System Requirement.

Figure 2C:
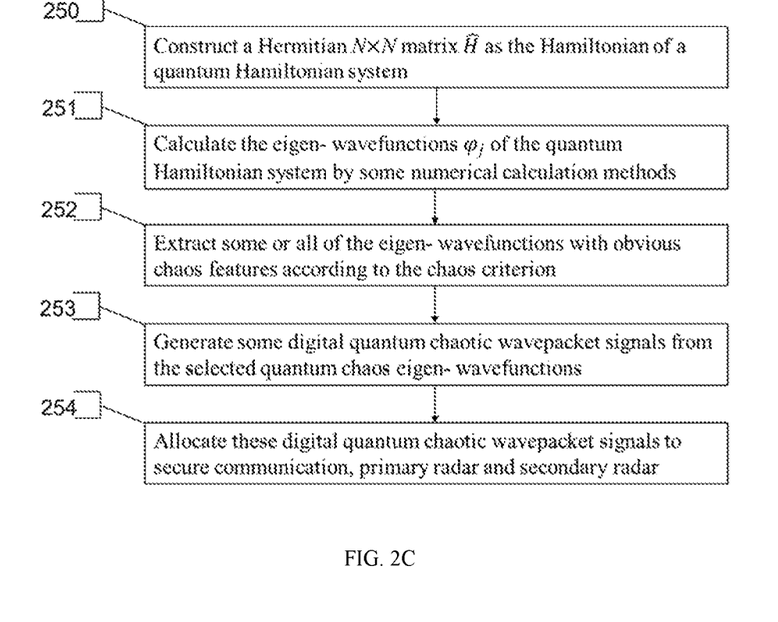
FIG. 2C is a flow chart for generating and allocating the quantum chaotic wavepacket signal according to the preferred embodiment of the invention shown in FIG. 2.

The fundamental digital quantum chaotic orthonormal wavepacket signal generation and allocation subprocess 200 is accomplished through the following procedures sequentially as shown in FIG. 2C.

Executing procedure 250: construct a N×N Hermitian matrix $\hat{H}$.

$$\hat{H}(x,y) = -\frac{a}{\sigma}e^{\frac{(x-y)^2}{b\sigma^2}}$$

wherein the a, b and σ are specific constant parameters.

Executing procedure 251: calculate the eigenvectors $\varphi_j$ of the Hermitian matrix $\hat{H}$ by some numerical calculation methods such as the Divide and Conquer Method, the Jacobian Method, etc.

$$\hat{H}\varphi_j = E_j\varphi_j$$

Executing procedure 252: extract some or all of the eigenvectors $\varphi_j$ with obvious chaos features according to a chaos criterion by the self-power spectrum density method.

Executing procedure 253: generate J semi-classical and digital quantum chaotic wavepacket signals $\varphi_j(n)$ with length N according to the mathematical correspondence between the classical signal and the wavefunction in quantum mechanics.

Executing procedure 254: allocate these above digital quantum chaotic wavepacket signals to the quantum chaotic wavepacket shift keying secure communication $\varphi_{j1}(n)$ and $\varphi_{j2}(n)$, the quantum chaotic wavepacket primary radar target detection $\varphi_{j3}(n)$ and the quantum chaotic wavepacket secondary radar target recognition $\varphi_{j4}(n)$ according to some optimization principles, such as EMC, etc.

Figure 3:
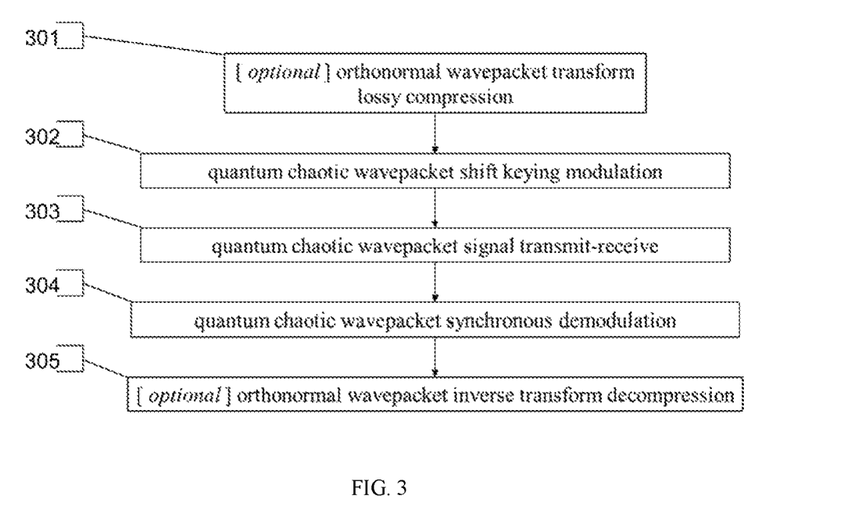
FIG. 3 is a flow chart of the quantum chaotic wavepacket shift keying communication according to the preferred embodiment of the invention shown in FIG. 2.

II. Optional Subprocess 210: Implement Quantum Chaotic Wavepacket Shift Keying Secure Communication The optional quantum chaotic wavepacket shift keying secure communication subprocess 210 includes five sequential procedure, the optional original image or data orthonormal wavepacket transform lossy compressing procedure 301, the quantum chaotic wavepacket shift keying modulation procedure 302, the quantum chaotic wavepacket signal transmit-receiving procedure 303, the quantum chaotic wavepacket synchronous demodulation procedure 304 and the optional orthonormal wavepacket inverse transform decompressing procedure 305 as shown in FIG. 3.

1. [Optional] the Original Image or Data Orthonormal Wavepacket Transform Lossy Compressing Procedure 301

Figure 3A:
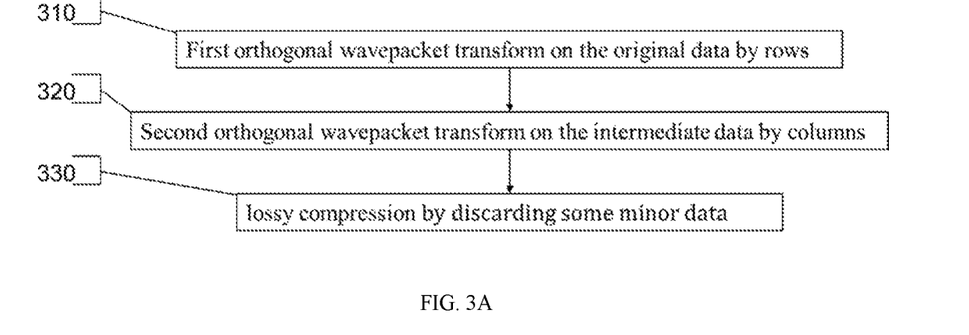
FIG. 3A is a flow chart of the orthonormal wavepacket transform confidential lossy compression according to the preferred embodiment of the invention shown in FIG. 3.

The optional original image or data orthonormal wavepacket transform lossy compressing procedure 301 accomplishes the data lossy compression to improve communication efficiency by twice orthogonal wavepacket transforms following the three steps sequentially shown in FIG. 3A.

Executing procedure 310: perform the orthonormal wavepacket transform on the original image or data $P_{t_{N\times N}}$ by rows to get an intermediate data $P^1_{t_{N\times N}}$ $$P^1_t(i,j) = \sum_k P_t(i,k)\varphi_j(k)$$

Executing procedure 320: perform the orthonormal wavepacket transform on the above intermediate data $P^1_{t_{N\times N}}$ by columns to get the final transformed data $P^2_{t_{N\times N}}$.

$$P^2_t(i,j) = \sum_k P^1_t(k,j)\varphi_i(k)$$

Executing procedure 330: perform the lossy compression of the above final transformed data $P^2_{t_{N\times N}}$ by discarding some minor data such as the data below the threshold $\mathcal{P}^2$ so as to get a small amount of compressed data [m, n, P²].

$$[m,n,P^2] = \{|P^2_t(m,n)| > \mathcal{P}^2\}$$

2. The Quantum Chaotic Wavepacket Shift Keying Modulation Procedure 302

The fundamental quantum chaotic wavepacket shift keying modulation procedure 302 implements the quantum chaotic wavepacket carriers $\varphi_{j1}$ and $\varphi_{j2}$ shift keying modulation with the input binary data D(n) to get quantum chaotic wavepacket baseband signal $s_t^{Comm}(n)$ for secure communication.

$$s_t^{Comm}(n) = \begin{cases} \varphi_{j1}(n\%N) & D\left(\left[\frac{n}{N}\right]\right) = 0 \\ \varphi_{j2}(n\%N) & D\left(\left[\frac{n}{N}\right]\right) = 1 \end{cases}$$

wherein the N is the length of the quantum chaotic wavepacket carrier.

3. The Quantum Chaotic Wavepacket Signal Transmit-Receiving Procedure 303

The fundamental quantum chaotic wavepacket signal transmit-receiving procedure 303 mainly accomplishes the transmission and reception of the quantum chaotic wavepacket baseband signal. In the transmitter, the quantum chaotic wavepacket baseband signal is transmitted either directly or frequency converted, correspondingly in the receiver the quantum chaotic wavepacket baseband signal is received either directly or frequency converted, as shown in FIG. 2 and FIG. 2A.

4. The Quantum Chaotic Wavepacket Synchronous Demodulation Procedure 304

Figure 4:
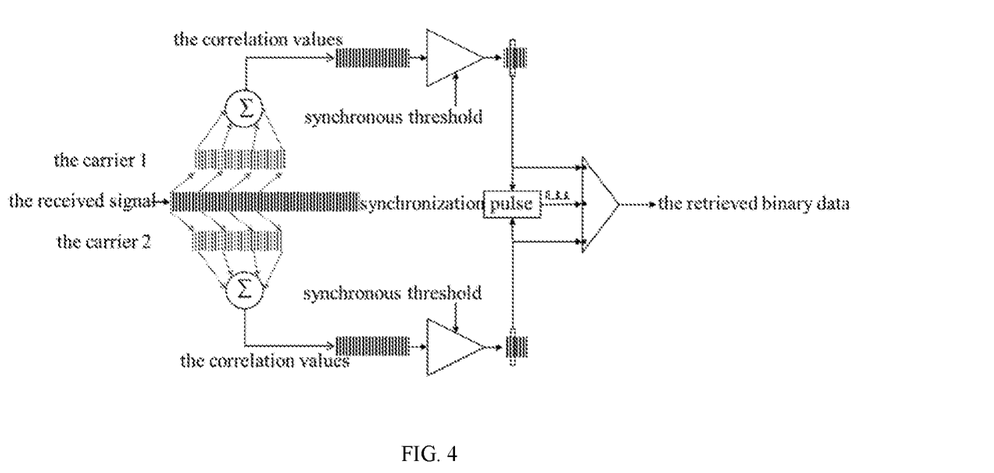
FIG. 4 is a block diagram of the quantum chaotic wavepacket synchronous demodulation module according to the preferred embodiment of the invention shown in FIG. 2.
Figure 4A:
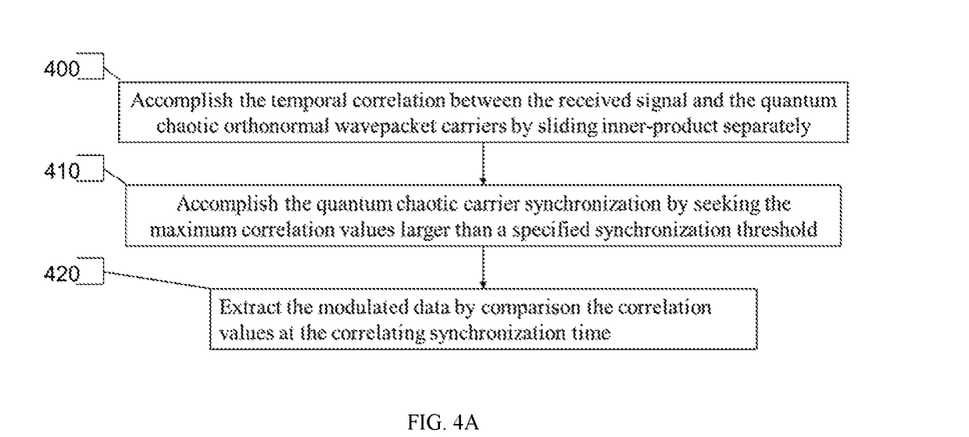
FIG. 4A is a work flow chart of the quantum chaotic wavepacket synchronous demodulation module according to the preferred embodiment of the invention shown in FIG. 4.

The quantum chaotic wavepacket synchronous demodulation procedure 304 mainly accomplishes the quantum chaotic wavepacket carrier synchronization with the received baseband signal and demodulation to extract the modulated data $\hat{D}(n)$. The block diagram which executes the procedure 304 is shown in FIG. 4, and the procedure 304 following the three steps sequentially is shown in FIG. 4A.

Executing procedure 400: accomplish the temporal digital correlation between the received baseband signal $s_r$ and the quantum chaotic wavepacket carriers $\varphi_{j1}$ and $\varphi_{j2}$ to get two nonnegative correlation value sequences by the sliding inner-product separately, $$R_j(k) = \left|\sum_n s_r(n+k)\varphi_j(n)\right|^2$$

wherein the j is j1 or j2.

Executing procedure 410: accomplish the quantum chaotic carrier synchronization by the summation $I^{sync}$ of the K span of the above two nonnegative correlation value sequences $R_{j1}(k)$ and $R_{j2}(k)$, $$I^{sync}(n) = \sum_k \sum_j R_j(n-k)$$

wherein j=j1,j2; k=1,2, ..., K. Meanwhile, the separate summation $I_j^{Demod}$ of the M span of the above two nonnegative correlation value sequences $R_{j1}(k)$ and $R_{j2}(k)$ is calculated, and normally M is 5 to 8 larger than K.

$$I_j^{Demod}(n) = \sum_m R_j(n-m)$$

wherein j=j1, j2; m=1, 2, ..., M.

Executing procedure 420: extract the modulated data D by comparison the above separate summation $I_{j1}^{Demod}$ and $I_{j2}^{Demod}$ at the correlating synchronization time $k_0$ when the $I^{sync}$ is equal or greater than a synchronous threshold $I_{ref}$.

$$\hat{D}(k_0) = \begin{cases} 0 & I_{j1}^{Demod}(k_0) \geq I_{j2}^{Demod}(k_0) \\ 1 & I_{j1}^{Demod}(k_0) < I_{j2}^{Demod}(nk_0) \end{cases}$$

5. [Optional] the Original Image or Data Orthonormal Wavepacket Inverse Transform Decompressing Procedure 305

Figure 5:
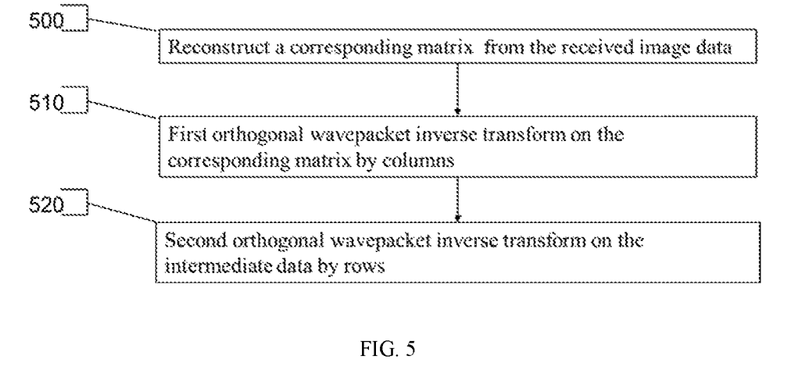
FIG. 5 is a work flow chart of the orthonormal wavepacket inverse transform decompression module for original image or data according to the preferred embodiment of the invention shown in FIG. 2.

The optional orthonormal wavepacket inverse transform decompressing procedure 305 accomplishes the image or data decompression by twice orthonormal wavepacket inverse transforms following the three steps sequentially shown in FIG. 5.

Executing procedure 500: preprocess the received image or data by reconstructing [m, n, $P^2$] of $\hat{D}(n)$ to a corresponding N-order square matrix $P_r^2$.

Executing procedure 510: perform the orthonormal wavepacket inverse transform on the above reconstructed matrix $P_r^2$ by columns to get the intermediate inverse transformed data $P_{r\,N\times N}^1$.

$$P_r^1(i, j) = \sum_k P_r^2(k, j)\varphi_i(k)$$

Executing procedure 520: perform the orthonormal wavepacket inverse transform on the above intermediate inverse matrix $P_{r\,N\times N}^1$ by rows to get the final decompressed data $P_{t\,N\times N}^1$.

$$P_r(i, j) = \sum_k P_r^1(i, k)\varphi^j(k)$$

Figure 6:
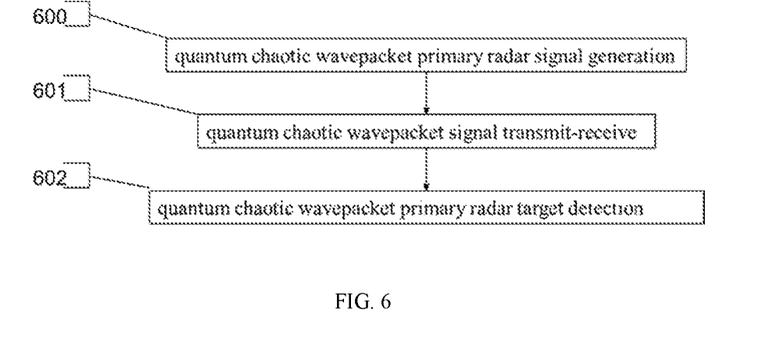
FIG. 6 is a block diagram of the quantum chaotic wavepacket primary radar according to the preferred embodiment of the invention shown in FIG. 2.

III. Optional Subprocess 220: Implement Quantum Chaotic Wavepacket Primary Radar Target Detection The quantum chaotic wavepacket primary radar target detection subprocess 220 is optional and includes three sequential procedures, the quantum chaotic wavepacket primary radar signal generating procedure 600, the quantum chaotic wavepacket signal transmit-receiving procedure 601 and the quantum chaotic wavepacket primary radar target detection procedure 602 as shown in FIG. 6.

1. The Quantum Chaotic Wavepacket Primary Radar Signal Generating Procedure 600

The fundamental quantum chaotic wavepacket primary radar signal generating procedure 600 mainly generates the quantum chaotic wavepacket primary radar baseband signal $s_t^{PriRadar}$ by transmitting the recurrent quantum chaotic wavepacket carrier $\varphi_{j3}$.

$$s_t^{PriRadar}(n) = \varphi_{j3}(n\% N)$$

wherein the N is the length of the quantum chaotic wavepacket primary radar carrier.

2. The Quantum Chaotic Wavepacket Signal Transmit-Receiving Procedure 601

The fundamental quantum chaotic wavepacket signal transmit-receiving procedure 601 mainly accomplishes the transmission and reception of the quantum chaotic wavepacket primary radar baseband signal. In the transmitter, the quantum chaotic wavepacket primary radar baseband signal is transmitted either directly or frequency converted, correspondingly in the receiver the quantum chaotic wavepacket primary radar baseband signal is received either directly or frequency converted, as shown in FIG. 2 and FIG. 2A.

3. The Quantum Chaotic Wavepacket Primary Radar Target Detection Procedure 602

Figure 6A:
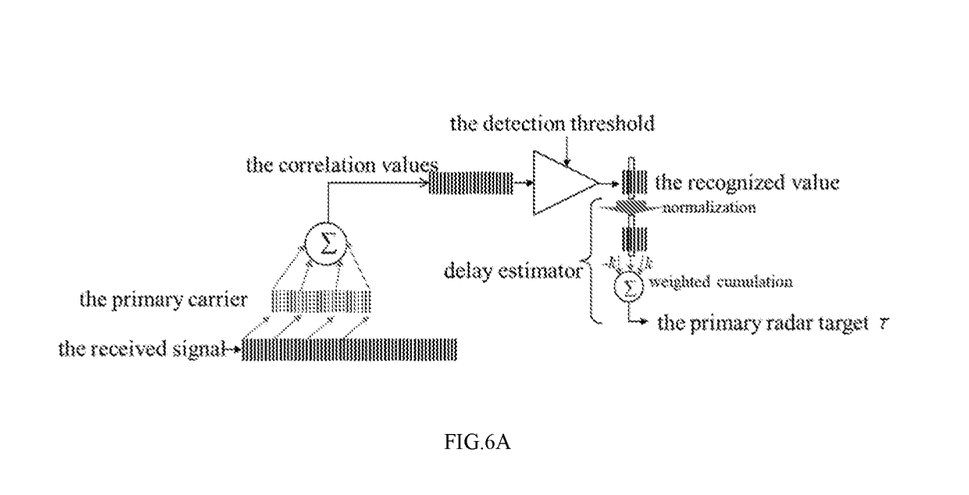
FIG. 6A is a block diagram of the quantum chaotic wavepacket primary radar target recognition according to the preferred embodiment of the invention shown in FIG. 6.
Figure 6B:
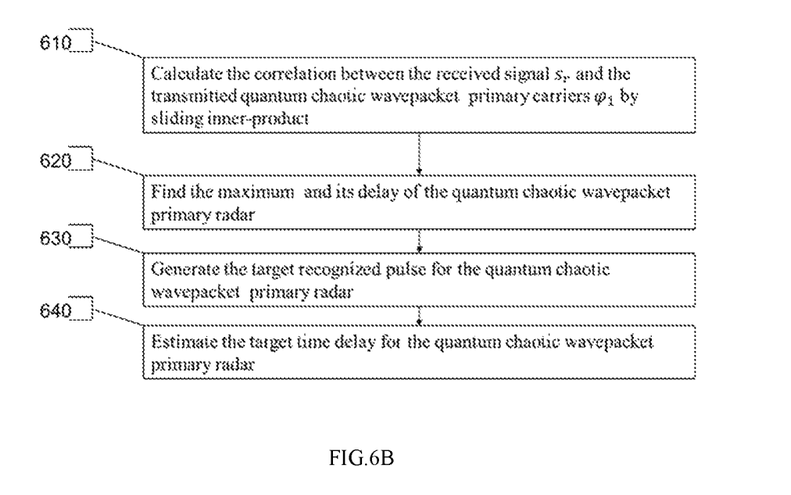
FIG. 6B is a work flow chart of the quantum chaotic wavepacket primary radar target recognition according to the preferred embodiment of the invention shown in FIG. 6.

The fundamental quantum chaotic wavepacket primary radar target detection module 602 mainly detects the interested target and extracts its information such as two-way delay by the correlation detection of the quantum chaotic wavepacket primary radar carrier in the received radar baseband signal shown in FIG. 6A following the three steps sequentially shown in FIG. 6B.

Executing procedure 610: perform the temporal digital correlation between the received radar baseband signal $s_r$ and the transmitted quantum chaotic wavepacket primary radar carrier $\varphi_{j3}$ to get a nonnegative correlation value sequence $R_{j3}$ by the sliding inner-product.

$$R_{j3}(k) = \left|\sum_n s_r(n+k)\varphi_{j3}(n)\right|^2$$

Executing procedure 620: find the maximum $R_{max}$ and its corresponding time delay $k_0$ in the span 2K of the above nonnegative correlation value sequence $R_{j3}$ (k).

$R_{j3}(k_0)=R_{max}$

Executing procedure 630: generate the primary radar target detection return-to-zero pulse by compare the maximum primary radar nonnegative correlation value $R_{j3}(k_0)$ with the threshold $R_{ref}$.

Executing procedure 640: estimate the two-way delay of the quantum chaotic wavepacket primary radar target by a normalized and weighted summation of the above nonnegative correlation value sequence $R_{j3}(k)$ by the trigger of the above primary radar target detection return-to-zero pulse.

$$k = k_0 + \sum_{k=-K}^{K} k \frac{R_{j3}(k_0 + k)}{R_{max}}$$

Figure 7:
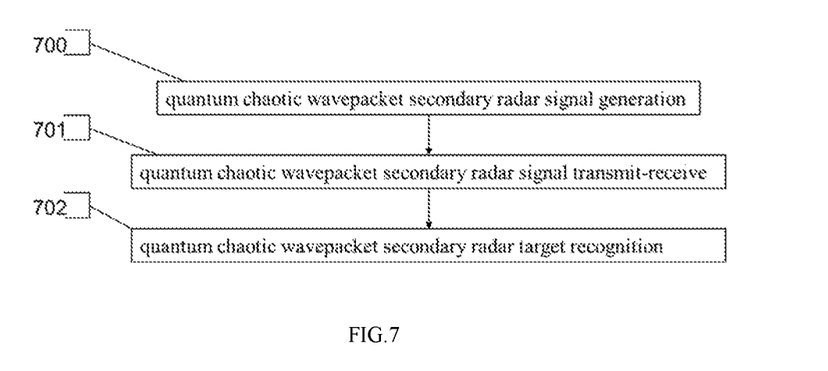
FIG. 7 is a block diagram of the quantum chaotic wavepacket secondary radar according to the preferred embodiment of the invention shown in FIG. 2.

Iv. Optional Subprocess 230 Implement Quantum Chaotic Wavepacket Secondary Radar Target Recognition The optional quantum chaotic wavepacket secondary radar target recognition subprocess 230 is optional and includes three procedures, the quantum chaotic wavepacket secondary radar signal generating procedure 700, the quantum chaotic wavepacket secondary radar signal transmit-receiving procedure 701 and the quantum chaotic wavepacket secondary radar target recognition procedure 702, as shown in FIG. 7.

1. The Quantum Chaotic Wavepacket Secondary Radar Signal Generating Procedure 700

Figure 7A:
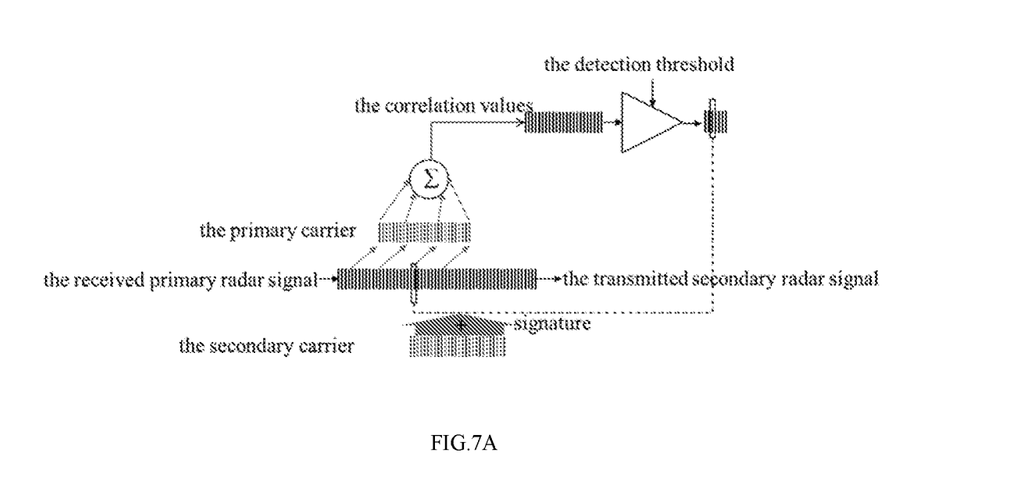
FIG. 7A is a block diagram of the quantum chaotic wavepacket secondary radar signal generation according to the preferred embodiment of the invention shown in FIG. 7.

The fundamental quantum chaotic wavepacket secondary radar signal generating procedure 700 mainly generates and transmits the digital recurrent quantum chaotic wavepacket secondary radar signal by superposing the quantum chaotic wavepacket signature signal on the captured quantum chaotic wavepacket primary radar signal. The block diagram of the procedure 700 is shown in FIG. 7A, and the procedure 700 executes the three procedures sequentially shown in FIG. 7B.

Figure 7B:
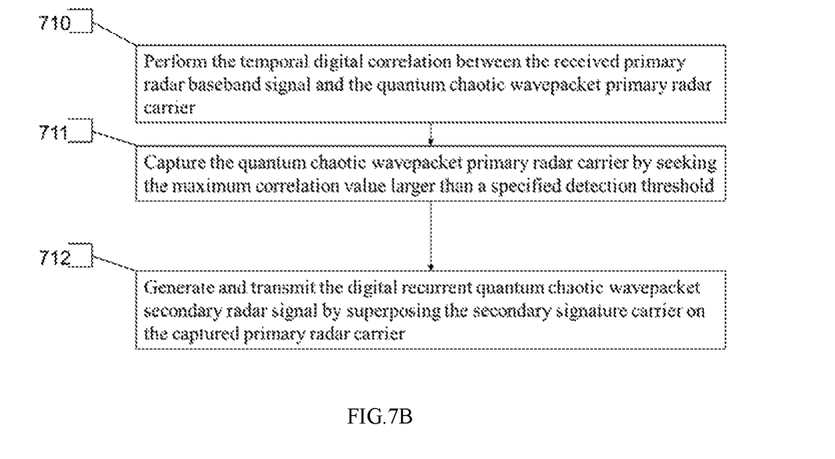
FIG. 7B is a work flow chart of quantum chaotic wavepacket secondary radar signal generation according to the preferred embodiment of the invention shown in FIG. 7.

Executing procedure 710: perform the temporal digital correlation between the received radar baseband signal $s_r^1$ and the transmitted quantum chaotic wavepacket primary radar carrier $\varphi_{j3}$ to get a nonnegative correlation value sequence $R_{j3}^1$ by the sliding inner-product.

$$R_{j3}^1(k) = \left| \sum_n s_r^1(n+k)\varphi_{j3}(n) \right|^2$$

Executing procedure 711: perform the capture of the quantum chaotic wavepacket primary radar carrier $\varphi_{j3}$ by seeking the maximum value $R_{max}^1$ in the span 2K of the above nonnegative correlation value sequence $R_{j3}^1$ larger than a specified detection threshold $R_{ref}^1$ and its corresponding delay $k_0^1$.

$$\begin{cases} R_{j3}^1(k_0^1) = \max\{R_{j3}^1(k)\} \\ R_{j3}^1(k_0^1) > R_{ref}^1 \end{cases}$$

Executing procedure 712: generate and transmit the digital recurrent quantum chaotic wavepacket secondary radar signal by superposing the quantum chaotic wavepacket signature carrier $\varphi_{j4}$ on the captured quantum chaotic wavepacket primary radar carrier $s_r^1$ at the capture time $k_0^1$.

$$s_t^1(n)=s_r^1(n+k_0^1)+\varphi_{j4}(n)$$

2. The Quantum Chaotic Wavepacket Secondary Radar Signal Transmit-Receiving Procedure 701

The fundamental quantum chaotic wavepacket secondary radar signal transmit-receiving procedure 701 mainly accomplishes the transmission and reception of the quantum chaotic wavepacket secondary radar baseband signal. In the transmitter, the quantum chaotic wavepacket baseband signal $\angle_{j3}$ and $s_t^1$ are transmitted either directly or frequency converted, correspondingly in the receiver the quantum chaotic wavepacket baseband signal $s_r^1$ and $s_r$ or $\varphi_{j3}+\varphi_{j4}$ is received either directly or frequency converted, as shown in FIG. 2 and FIG. 2A.

3. The Quantum Chaotic Wavepacket Secondary Radar Target Recognition Procedure 702

Figure 7C:
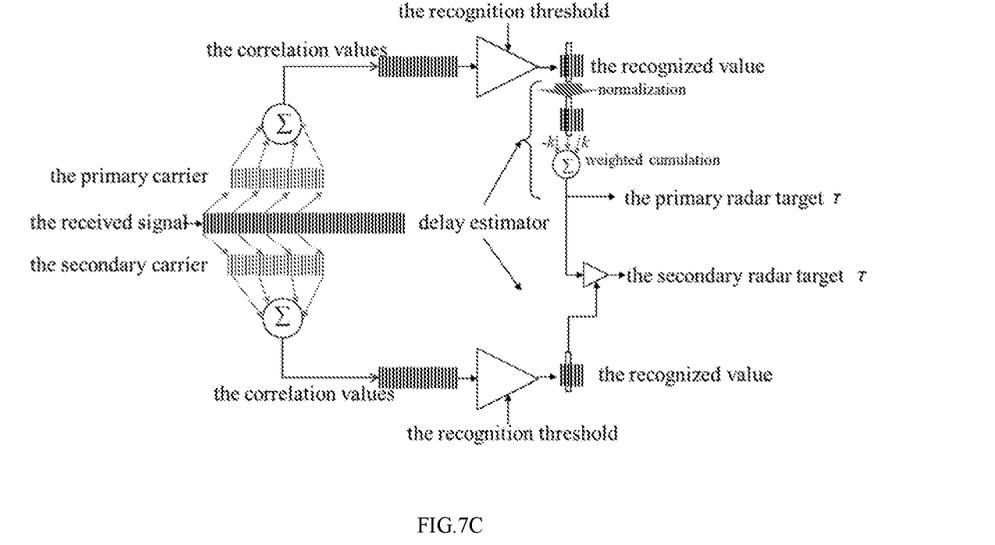
FIG. 7C is a block diagram of the quantum chaotic wavepacket secondary radar target recognition according to the preferred embodiment of the invention shown in FIG. 7.
Figure 7D:
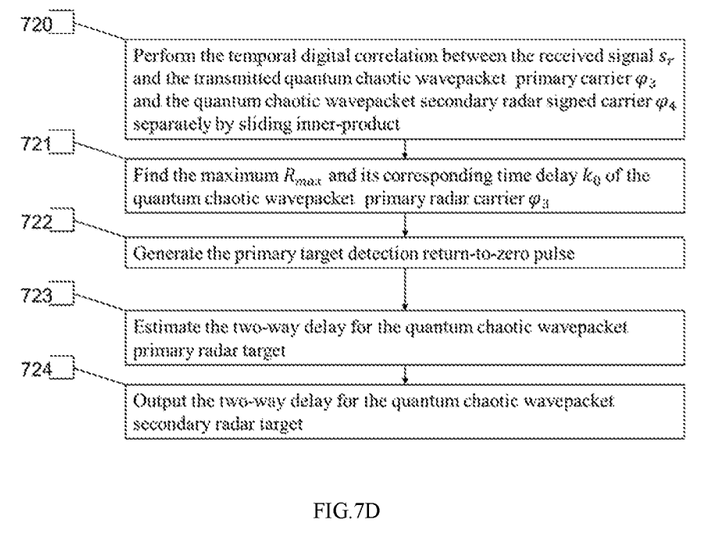
FIG. 7D is a work flow chart of the preferred scheme for the quantum chaotic wavepacket secondary radar target recognition according to the preferred embodiment of the invention shown in FIG. 7.

The fundamental quantum chaotic wavepacket secondary radar target recognition procedure 702 mainly recognizes the interested target and extract its information such as two-way delay by joint correlation detection shown in FIG. 7C, and executes the five procedures sequentially shown in FIG. 7D.

Executing procedure 720: perform the temporal digital correlation between the received radar baseband signal $s_r$ and the transmitted quantum chaotic wavepacket primary radar carrier $\varphi_{j3}$ to get a nonnegative correlation value sequence $R_{j3}(k)$, and similarly perform the temporal digital correlation between the received radar baseband signal $s_r$ and the transmitted quantum chaotic wavepacket secondary radar carrier $\varphi_{j4}$ to get nonnegative correlation value sequence $R_{j4}(k)$ by the sliding inner-product.

$$R_{j3}(k) = \left| \sum_n s_r(n+k)\varphi_{j3}(n) \right|^2$$

$$R_{j4}(k) = \left| \sum_n s_r(n+k)\varphi_{j4}(n) \right|^2$$

Executing procedure 721: find the maximum $R_{max}$ and its corresponding time delay $k_0$ in the span 2K of the above nonnegative correlation value sequence $R_{j3}(k)$.

$R_{j3}(k_0)=R_{max}$

Executing procedure 722: generate the primary target detection return-to-zero pulse by compare the above maximum primary nonnegative correlation value $R_{j3}(k_0)$ with the primary detection threshold $R_{ref}$.

Executing procedure 723: estimate the two-way delay for the quantum chaotic wavepacket primary radar target by a normalized and weighted summation of above primary nonnegative correlation value sequence $R_{j3}(k)$ by the trigger of the above primary radar target detection return-to-zero pulse.

$$k = k_0 + \sum_{k=-K}^{K} k \frac{R_{j3}(k_0 + k)}{R_{max}}$$

Execution procedure 724: calculate the summation of the span from $[k]-\delta_n$ to $[k]+\delta_n$ of the secondary nonnegative correlation value sequence $R_{j4}(k)$ and to output the two-way delay for the quantum chaotic wavepacket secondary radar target by compare the above summation value with the recognition threshold $R_{j4_{ref}}$.

$$\sum_{k=[k]-\delta_n}^{[k]+\delta_n} R_{j4}(k) > R_{j4_{ref}}$$

To have a better understanding of the invention, two embodiments s are described in detail, but are not a limitation to the invention. According to the technical essence of the invention, any simple modification to the above embodiments should still be within the scope of the invention. Each embodiment in this specification focuses on the differences from other embodiment, which are referred to each other in the same or similar parts. For system embodiment, the description is relatively simple because it corresponds to the method embodiment, so that it can refer to the relevant description of the method embodiment.

What is claimed is:

1. A method for generating digital quantum chaotic wavepacket signals, implemented by a unified software defined radio system which unifies a quantum chaotic wavepacket secure communication and a primary and secondary radar comprising the following steps:

step one: construct a Hermitian N×N matrix H;

step two: calculate N eigen-wavefunctions pj of a quantum Hamiltonian system with the Hamiltonian by some numerical calculation methods, wherein the Hamiltonian is the N×N Hermitian matrix H;

step three: extract some or all of the eigen-wavefunctions pO with obvious chaos features as quantum chaotic eigen-wavefunctions according to a chaos criterion;

step four: generate some semi-classical digital quantum chaotic wavepacket signals pj(n) with the same mathematical form as that of the quantum chaotic eigen-wavefunctions and length N from the selected quantum chaotic eigen-wavefunctions according to the mathematical correspondence between the classical signal and the wavefunction in quantum mechanics, wherein the wavepacket signals not only have the same features as classical chaotic signals but also have a unique splitting spectrum characteristic.

2. The method according to claim 1, wherein,
the N×N Hermitian matrix $\hat{H}$ is used as the Hamiltonian of the quantum Hamiltonian system and has the following mathematical expression:

$$\hat{H}(x,y) = -\frac{a}{\sigma} e^{\frac{(x-y)^2}{b\sigma^2}};$$

wherein a, b and σ represent a first predetermined constant parameter, a second predetermined constant parameter and a third predetermined constant parameter, respectively.

3. The method according to claim 2, wherein,
the quantum Hamiltonian system with the Hamiltonian has a quantum state chaotic transition, and the plurality of eigen-wavefunctions have features corresponding to classical chaotic signals.

4. The method according to claim 3, wherein,
the N eigen-wavefunctions $\varphi_j$ meet the following mathematical constraint:

$$\hat{H}\varphi_j = E_j\varphi_j;$$

wherein $E_j$ is an energy level of a quantum corresponding to the N eigen-wavefunctions $\varphi_j$.

5. The method according to claim 4, wherein,
the numerical calculation methods comprise at least one selected from the group consisting of a Divide and Conquer method, and a Jacobian method.

6. The method according to claim 5, wherein,
Hermitian external perturbation H' is added to the N×N Hermitian matrix $\hat{H}$ to get different eigen-vectors $\varphi_j$ by the numerical calculation methods, wherein the different eigen-vectors are expressed as follows:

$$(\hat{H}+H')\varphi_j = E_j\varphi_j.$$

7. The method according to claim 1, wherein,
a self-power spectral density method is used as the chaos criterion.

8. The method according to claim 7, wherein,
according to the chaos criterion, the momentum spectral density $\Psi_1$ is calculated by performing a Fourier Transform on the N eigen-wavefunctions $\varphi_j$.

9. The method according to claim 8, wherein,
according to the chaos criterion, a chaotic property of the N eigen-wavefunctions $\varphi_j$ is determined by the momentum spectral density $\Psi_j$.

10. The method according to claim 9, wherein,
the N eigen-wavefunctions $\varphi_j$ with extended momentum spectral density is chaotic, and is a quantum chaotic wavefunction.

* * * * *